Jan. 7, 1964     A. R. KOPP     3,117,189
ELECTROMECHANICAL TRANSDUCER
Filed Dec. 11, 1958     2 Sheets-Sheet 1
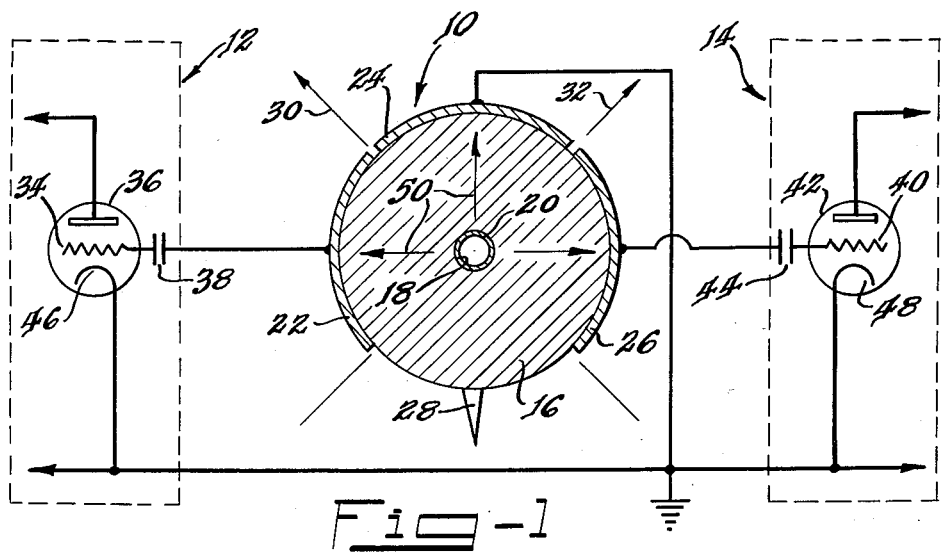
Fig-1
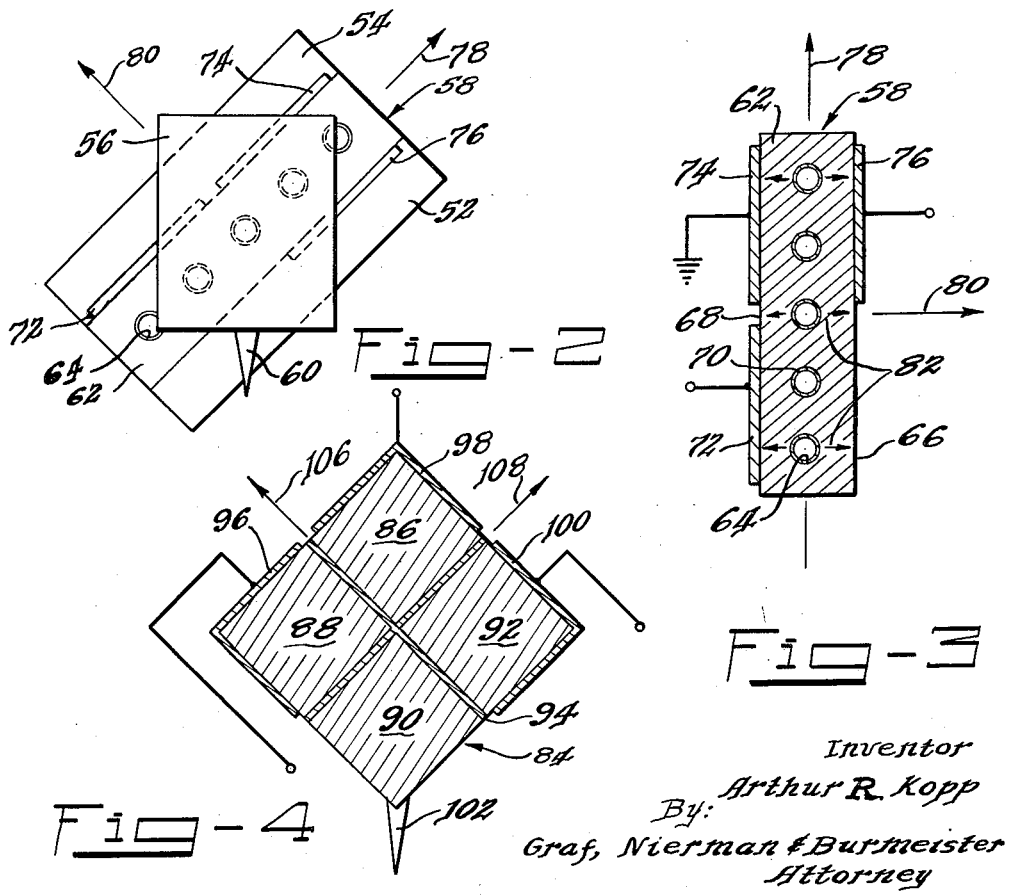
Fig-2
Fig-3
Fig-4
Inventor
Arthur R. Kopp
By: Graf, Nierman & Burmeister
Attorney Jan. 7, 1964  A. R. KOPP  3,117,189
ELECTROMECHANICAL TRANSDUCER
Filed Dec. 11, 1958  2 Sheets-Sheet 2
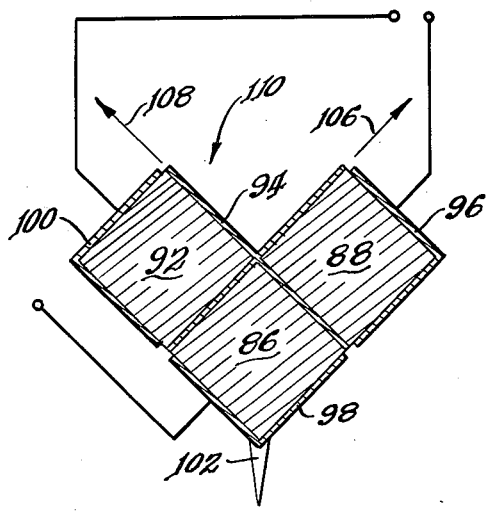
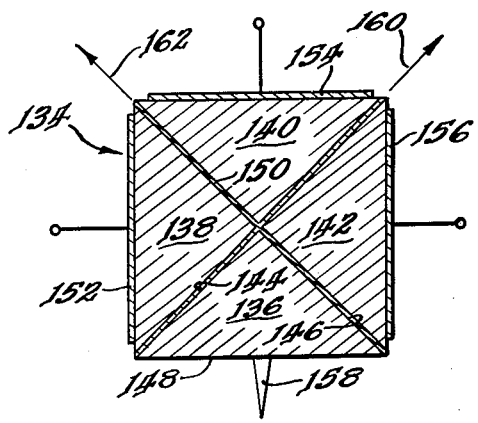
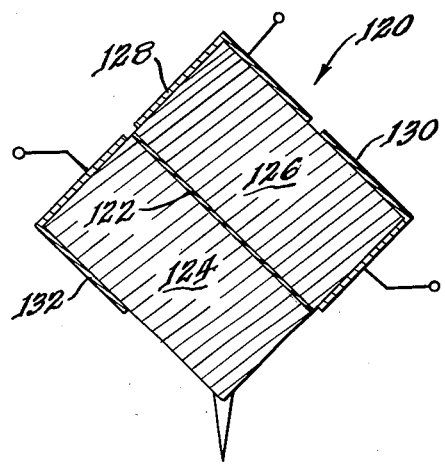
Inventor
Arthur R. Kopp
By:
Graf, Nierman & Burmeister
Attorney

United States Patent Office 3,117,189
Patented Jan. 7, 1964

3,117,189
ELECTROMECHANICAL TRANSDUCER
Arthur R. Kopp, Orlando, Fla., assignor to Electro-Voice, Incorporated, Buchanan, Mich., a corporation of Indiana
Filed Dec. 11, 1958, Ser. No. 779,669
19 Claims. (Cl. 179—100.41)

The present invention relates generally to electromechanical transducers, and more particularly to piezoelectric transducers for use in stereophonic phonograph pickups.

Phonograph pickups for use with monaural records have long employed ceramic elements to generate electrical potentials in response to the undulations of a record groove. Such ceramic elements consist of an elongated body of piezoelectric ceramic materials with a pair of electrodes disposed on opposite surfaces of the body. For responding to laterally cut records, the electrodes are disposed on opposite sides of the vertical axis of the body, so that a lateral undulation impresses a charge between the electrodes. Vertical displacement of the element results in a charge appearing upon the upper and lower surfaces of the element, but since both positive and negative charges are developed on each of the electrodes, the charges on the electrodes cancel out, and the pickup produces no response.

The patent application of Alpha M. Wiggins and John F. Wood entitled "Piezoelectric Transducer," Serial No. 721,188, discloses a ceramic element for use in stereophonic phonograph pickups. The transducer disclosed in the Wiggins and Wood application employs two pair of electrodes on the surface of an elongated body of piezoelectric material, and the axis of each pair of electrodes is aligned with the axis of the impressed forces. In other words, the electrodes of each pair are positioned to center on the portions of the surface of the body which receive the optimum charges resulting from a displacement along the respective force axes, and each pair of electrodes thus integrates the charges developed over the portions of the body receiving the optimum charges for a given displacement.

The present inventor has discovered that an electromechanical transducer may be constructed to respond to forces exerted along two normally related axes with an elongated piezoelectric body having electrodes disposed on its surface which extend between the force axes. In such a construction, no electrode crosses a force axis.

There are several advantages gained by constructing a piezoelectric transducer with electrodes disposed on the body of the transducer between force axes. As will be described hereinafter, a three electrode transducer may be constructed in this manner with one of the electrodes serving as a common electrode. With such a transducer, the common electrode may be grounded, and the other electrodes connected to each of two electrical channels without sacrificing isolation between channels.

Further, the Wiggins and Wood application referred to above discloses piezoelectric elements formed by four piezoelectric members with two intersecting normal surfaces provided with electrically conducting coatings and joined to two adjacent members having electrically conducting coated surfaces to form a rectangular body, the body having four electrodes on the exterior surfaces thereof. Each of the electrodes in such a construction is disposed upon the surface of two adjacent members and extends over the electrically conducting interface between the members. By constructing a transducer according to the teachings of the present invention, a rectangular element having four members may be constructed without requiring the electrodes on the exterior surface of the member to cross electrically conducting interfaces between the members.

The present invention also makes it possible to provide an electromechanical transducer which employs only three rectangular piezoelectric members mounted to each other by electrically conducting interfaces, rather than the four member construction referred to above. This construction not only reduces the material required in the transducer, but also increases the compliance of the transducer.

These advantages and additional advantages will be more thoroughly understood from a further reading of this disclosure, particularly when viewed in the light of the drawings, in which:

FIGURE 1 is a schematic electrical circuit diagram illustrating an electromechanical transducer in the form of a phonograph pickup electrically connected to the input of two electrical channels;

FIGURE 2 is an end elevational view of a phonograph pickup constructed according to the teachings of the present invention and of a different construction from that illustrated in FIGURE 1;

FIGURE 3 is a transverse sectional view of the piezoelectric element employed in the phonograph pickup of FIGURE 2; and FIGURES 4, 5, 6, and 7 are transverse sectional views of piezoelectric elements employed as phonograph pickups which constitute additional embodiments of the present invention.

FIGURE 1 illustrates a phonograph pickup 10 electrically connected to the input of two amplifiers 12 and 14. The pickup 10 employs an elongated cylindrical body 16 of piezoelectric material which is provided with a cylindrical channel 18. The channel 18 has a coating 20 of electrically conducting material. Three electrodes 22, 24, and 26 are disposed on the surface of the body 16 parallel to the longitudinal axis thereof. Each of the electrodes 22, 24, and 26 extends through an equal arc, this arc being slightly less than 90 degrees. Further, the pickup 10 is provided with a stylus 28. Since the stylus 28 is intended to ride in the groove of a stereophonic record which is recorded with two sound channels impressed in the groove on orthogonally related axes disposed at 45 degrees to the surface of the record, the axes through which the forces are exerted on the pickup 10 will be preferably disposed generally normal to the axis of the body 16 and at 45 degrees relative to the axis of the stylus 28, these axes being designated 30 and 32 in FIGURE 1. Each of the electrodes 22, 24, and 26 is totally disposed between the axes 30 and 32.

The electrode 22 is electrically connected to the grid 34 of a vacuum tube 36 through a capacitor 38, the tube 36 being a portion of an electronic amplifier forming a part of a sound channel 12. In like manner, the electrode 26 is electrically connected to a grid 40 of a vacuum tube 42 through a capacitor 44, the vacuum tube 42 being a part of an amplifier in a second sound channel 14. The tubes 36 and 42 have cathodes 46 and 48, respectively, which are interconnected and also connected to the electrode 24 of the pickup 10.

The body 16 of the pickup 10 is radially polarized. The body 16 will generally be constructed of artificial piezoelectric material which is polarized by connecting the three electrodes 22, 24, and 26 to one pole of a direct current source, and the electrically conducting coating 20 of the pickup 10 to the other pole of the direct current source. The arrows 50 have been inserted between the coating 20 and the electrodes 22, 24, and 26 to indicate the axis of polarization, although it is to be understood that the direction of polarization may be reversed. One end of the elongated body 16 is mounted in a fixed position, and the stylus 28 is mounted to the other end of the body, thus resulting in bending the body in response to the undulations of a record rather than twisting the body. Considering a force in the direction of the arrow along the axis 32, it is to be noted that the electrodes 24 and 26 will assume equal potentials of one sign, and the electrode 22 will assume an equal potential of the reverse sign. As a result, the charges developed across the electrodes 22 and 24, these electrodes being serially connected in the input of the channel 12, will add. However, the charges developed on the electrodes 24 and 26, which are connected in series in the input of the channel 14, will oppose and cancel. Hence, a force along the axis 32 produces an output in channel 12 but none in channel 14. In like manner, a force exerted along the axis 30 produces an output in channel 14 but none in channel 12.

FIGURES 2 and 3 illustrate another embodiment of the invention again in the form of a phonograph pickup. This phonograph pickup is mounted at one end by a pair of resilient pads 52 and 54, such as rubber, and employs a cap or body 56 attached to the other end of the element, the element being designated 58. A phonograph stylus 60 is embedded in the cap 56 and is adapted to ride in the groove of a stereophonic phonograph record.

The element 58 has an elongated piezoelectric body 62 with a rectangular cross-section and a plurality of channels 64 extending through the body parallel to the axis thereof on a plane located midway between a pair of parallel surfaces 66 and 68 of the body 62. Each of the channels 64 is provided with an electrically conducting coating 70. The element 58 is also provided with three electrodes 72, 74, and 76 of approximately equal area disposed on the surfaces 66 and 68. The electrodes 74 and 76 are disposed on the surfaces 68 and 66 on one side of an axial plane normal to the surfaces 66 and 68, and the electrode 72 is disposed on the surface 68 on the opposite side of the plane.

The force axes are indicated by the lines 78 and 80, and are parallel to and normal to the surfaces 66 and 68, respectively. The body 62 is polarized by connecting the electrodes 72, 74, and 76 to one terminal of a direct current source and the coatings 70 to the other terminal, thus resulting in polarization axes indicated by the arrows 82 to extend between the surfaces 66 and 68 and the plane of the channels 64.

A deflection of the element 58 along the axis 80 results in the electrodes 72 and 74 assuming a first potential, and the electrode 76 assuming an equal but opposite potential. Since the electrodes 74 and 76 are connected in series for one channel, these potentials add. Further, the electrodes 72 and 74 are connected in series for the second channel resulting in cancellation of the potentials developed on these electrodes. Hence, a force impressed along the axis 80 results in an output between the electrodes 74 and 76 but no output between the electrodes 72 and 74, and a force along the axis 78 produces the reverse result.

FIGURE 4 illustrates an elongated element 84 which is formed of four elongated piezoelectric members 86, 88, 90, and 92 of piezoelectric material with square cross-sections. The four members are provided with electrically conducting coatings 94 on two adjacent surfaces thereof, and the electrically conducting coatings of two other members to assemble the four members into a single element with a square cross-section. An electrode 96 is disposed upon the surfaces of the member 88 opposite the coated surface and the edge between these surfaces. In like manner, an electrode 98 is disposed on the surfaces of the member 86 opposite the coated surfaces and the edge surface therebetween, and an electrode 100 is disposed upon the surfaces of the member 92 opposite the coated surfaces and the edge therebetween.

The element 84 is mounted at one end in the manner of the previously described elements, and a stylus 102 is mounted to the other end of the element 84. As indicated by the lines 106 and 108 of FIGURE 4, the force vectors impressed upon the element through the stylus 102 are disposed in the planes of the electrically conducting coating 94, which assumes a cruciform shape. The electrode 98 also forms a common electrode for both electronic channels. Polarization of the element 84 is achieved when artificial piezoelectric material is employed for the members by connecting the electrically conducting coatings 94 to one terminal of a direct current source and connecting the electrodes 96, 98, and 100 to another terminal of the direct current source. In this manner, a polarization simulating radial polarization results.

A force exerted along the vector 108 will place an equal charge on each of the electrodes 98 and 100, and will place an equal charge of opposite sign on the electrode 96. With the electrode 98 as the common electrode between two channels, the charges on the electrodes 96 and 98 will add to produce an output in one channel, while the charges by the electrodes 98 and 100 will cancel, thereby minimizing the output from the other channel.

FIGURE 5 illustrates a phonograph pickup which is similar to the pickup illustrated in FIGURE 4 and described above, except that the elongated piezoelectric member 90 has been omitted from the element, designated 110. Since the element 110 is alike in other respects, the portions of the element which are identical to those of FIGURE 4 will be designated by the same reference numerals. The coating 94 in the embodiment of FIGURE 5 retains its cruciform shape, and is employed in the polarization of the element 110.

The element 110 operates in a manner identical to the element 84, except that the elimination of the member 90 increases the compliance of the element 110 over that of the element 84.

FIGURE 7 illustrates a modification of the element illustrated in FIGURES 2 and 3. In the element of FIGURES 2 and 3, polarization of the artifical piezoelectric body 62 is obtained by means of electrically conducting coatings 70 disposed upon the surfaces of parallel channels 64 extending through the element 62. In FIGURE 7, the element designated 120 provides an electrically conducting plane in the form of a coating or layer 122 between two elongated rectangular members 124 and 126 of artificial piezoelectric material. The members 124 and 126 together have a square cross-section. Two elongated electrodes 128 and 130 of equal area are disposed upon the surfaces of the member 126, and a single electrode 132, also of equal area, is disposed upon the surfaces of the member 124.

The electrodes 128 and 132 are disposed on the members 126 and 124, respectively, between an axial plane normally bisecting the electrically conducting layer 122, and extend from this plane to the electrically conducting layer including the edges of the members 126 and 124. Also, the electrode 130 is disposed on the opposite side of the plane on the surface of the element 126 between the plane and the electrically conducting surface 122. By electrically connecting the layer 122 to one terminal of a direct current source and the electrodes to another terminal thereof, the members 124 and 126 will be polarized in opposite directions causing the element 120 to operate in a manner similar to the element 58 of FIGURES 2 and 3.

FIGURE 6 illustrates an electromechanical transducer used as a phonograph pickup with an element 134 which constitutes another embodiment of the present invention. The element 134 is provided with four elongated members 136, 138, 140, and 142 of piezoelectric material which are provided with a pair of flat surfaces 144 and 146 disposed at 90 degrees to each other. Each of the members has a triangular cross-section formed by the surfaces 144 and 146 and a surface 148 opposite the right angle.

The members 136, 138, 140, and 142 are mounted together by an electrically conducting layer 150 disposed between the surfaces 144 of the members and the confronting surfaces 146 of the adjacent members, thereby forming a cruciform shaped electrically conducting surface between the members. The member 138 is provided with an electrode 152 on its surface 148, and the members 140 and 142 are provided with electrodes 154 and 156 in like manner. A stylus 158 extends normally from the surface 148 of the member 136.

A force exerted along an axis in the plane of the electrically conducting coating, these axes being designated 160 and 162, results in the development of charges of opposite sign upon the electrodes 152 and 156. Hence, the charge developed upon the electrode 154 will cancel the charge developed upon one of these electrodes and add to the charge developed upon the other of these electrodes. The electrode 154 may thus be used as a common electrode for both channels.

The term "artificial piezoelectric material" has been used throughout this disclosure to indicate materials which may be charged or polarized by the application of a direct current potential. Among suitable materials of this class are barium titanite and lead zirconium titanite. The electrodes and electrically conducting surfaces may be any of the well known metallic conductors, such as silver, gold or copper.

Those skilled in the art will readily devise many modifications and applications for the present invention in addition to those described hereinbefore. For example, even though the transducers herein described have been illustrated as phonograph pickups, it is clear that they may be applied to any application requiring an independent response to two forces. It is therefore intended that the scope of the present invention be not limited by the foregoing disclosure, but rather only by the appended claims.

The invention claimed is:

1. An electromechanical transducer comprising an elongated body of piezoelectric material having polarization vectors extending normal to the axis of elongation of the body and in opposite directions therefrom, means for mounting the body at one end, means for impressing a force on the other end of the body, and three electrodes disposed on the surface of the body, each electrode being totally disposed on the portion of the body between two orthogonally related axial planes of the body, said element generating an electrical potential between two of the electrodes responsive to the component of the force impressed on the body in one of said orthogonally related planes and a second potential between a different two electrodes responsive to the component of said force in the other of said orthogonally related planes.

2. An electromechanical transducer comprising the elements of claim 1 wherein the body has a circular cross-section.

3. An electromechanical transducer comprising the elements of claim 1 wherein the body has a square cross-section, and the electrodes are disposed on the surfaces of the body between edges thereof.

4. An electromechanical transducer comprising the elements of claim 1 wherein the body has a square cross-section and each electrode is disposed upon two adjacent surfaces of the body and the edge of the body between the surfaces.

5. An electromechanical transducer comprising the elements of claim 1 wherein the body has a rectangular cross-section.

6. An electromechanical transducer comprising the elements of claim 1 wherein the body comprises three members having two surfaces intersecting normally at one edge, said members being secured together with the edges thereof confronting each other, and an electrode disposed on each member remote from the surfaces.

7. An electromechanical transducer comprising the elements of claim 1 wherein the body has a pair of exterior surfaces one of the orthogonal planes of said element being disposed between the surfaces, said body being electrically polarized in opposite directions from said orthogonal plane, the first of the three electrodes being disposed on one surface and the second of said three electrodes being disposed on the other surface, said electrodes being totally disposed on one side of the other orthogonal plane of the body, said other orthogonal plane bisecting the one orthogonal plane, and the third of said electrodes being disposed on the body on the opposite side of the planal bisector from the first and second electrodes.

8. An electromechanical transducer comprising the elements of claim 7 wherein the body has a rectangular cross-section and the one orthogonal plane is disposed parallel to two of the surfaces thereof and midway between said surfaces.

9. An electromechanical transducer comprising the elements of claim 7 wherein the body has a rectangular cross-section and each of the orthogonal planes extends between two opposite edges of the body.

10. An electromechanical transducer comprising the elements of claim 7 wherein the body is provided with an electrically conducting surface disposed in contact with the body between the pair of exterior surfaces, said body being electrically polarized between the electrically conducting surface and each of the surfaces.

11. An electromechanical transducer comprising the elements of claim 1 wherein the body comprises first, second, and third elongated rectangular members of equal cross-section and artificial piezoelectric material, an electrically conducting layer disposed on two adjacent sides of each member and the included corner thereof, means for mounting the members together with each of the electrically conducting layers of the first member abutting one of the electrically conducting layers of one of the second and third members, the coated corners of the three members abutting each other, the electrodes being disposed on the surfaces of the first, second, and third member opposite the electrically conducting layers thereof.

12. An electromechanical transducer comprising the elements of claim 11 in combination with a fourth rectangular member of artificial piezoelectric material having the same cross-section as the other three members, and a layer of electrically conducting material disposed on two adjacent surfaces thereof and the included corner thereof, said fourth member being disposed in contact with the first, second, and third members with the corners of the members abutting each other.

13. An electromechanical transducer comprising the elements of claim 10 wherein the electrically conducting surface comprises a plurality of parallel channels disposed in a plane between the surfaces of the body, and an electrically conducting coating disposed on the surface of each channel.

14. A phonograph pickup comprising the elements of claim 7 in combination with a stylus secured to the end of the body opposite the mounting means.

15. A phonograph pickup comprising the elements of claim 11 in combination with a stylus mounted on the end of the assembled members opposite the mounting means.

16. An electromechanical transducer comprising a body of artificial piezoelectric material having a central axis of elongation, means for mounting the body at one end of the axis of elongation, means for impressing a force on the other end of said body, a pair of electrodes totally disposed on opposite surfaces of the body between two orthogonally related planes traversing the axis of elongation of the body, a third electrode disposed on the surface of the body between the pair of electrodes and totally disposed between the orthogonally related planes, the body being electrically polarized to generate charges of opposite polarity on the electrodes of the pair in response to a force exerted in the said orthogonally related planes of the pair of electrodes.

17. An electromechanical transducer comprising the elements of claim 16 wherein the electrodes of the pair and the third electrode cover equal areas of the body and are symmetrically disposed between the orthogonally related axes.

18. A phonograph pickup comprising the elements of claim 17 wherein the means for impressing a force on the body comprises a stylus coupled to the end of the body, said stylus being disposed normal to the plane of the pair of electrodes.

19. A stereophonic phonograph comprising the elements of claim 18 in combination with a first electroacoustic channel having an input electrically connected across one of the electrodes of the pair and the third electrode, and a second electroacoustic channel electrically connected across the other of the electrodes of the pair and the third electrode.

References Cited in the file of this patent

UNITED STATES PATENTS 2,955,216     Dieter _____ Oct. 4, 1960